(12) United States Patent
Ahn et al.

(10) Patent No.: US 8,250,592 B2
(45) Date of Patent: Aug. 21, 2012

(54) OPTICAL DISK APPARATUS

(75) Inventors: Cheol-woong Ahn, Seoul (KR); Un-jin Choi, Suwon-si (KR); Min-shik Roh, Seoul (KR); Jeong-hun Yeom, Seongnam-si (KR); Sung-hun Lee, Hwaseong-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 593 days.

(21) Appl. No.: 12/426,331

(22) Filed: Apr. 20, 2009

(65) Prior Publication Data
US 2009/0271810 A1 Oct. 29, 2009

(30) Foreign Application Priority Data
Apr. 25, 2008 (KR) .................. 10-2008-0038896

(51) Int. Cl.
*G11B 17/03* (2006.01)
(52) U.S. Cl. ........ 720/636; 720/601; 720/609; 720/628; 720/638
(58) Field of Classification Search .................. 720/601, 720/609, 628, 636, 638
See application file for complete search history.

(56) References Cited

U.S. PATENT DOCUMENTS

| 6,654,334 | B1 * | 11/2003 | Yamashita et al. | 720/641 |
| 7,640,556 | B2 * | 12/2009 | Oota | 720/607 |
| 7,831,983 | B2 * | 11/2010 | Ahn et al. | 720/623 |
| 2007/0192781 | A1 * | 8/2007 | Ahn et al. | 720/714 |
| 2009/0031332 | A1 * | 1/2009 | Fujisawa | 720/601 |

FOREIGN PATENT DOCUMENTS

JP 2006-073059 3/2006
KR 1020070082502 8/2007

\* cited by examiner

*Primary Examiner* — Hoai V Ho
*Assistant Examiner* — Pablo Huerta
(74) *Attorney, Agent, or Firm* — NSIP Law

(57) ABSTRACT

Provided is an optical disk apparatus in which an interlocking slider engaged with a main slider directly drive an eject lever and a boss for performing a disk chucking operation. The optical disk apparatus includes a housing having a slot to receive a disk, a main unit having a turn table to rotate the disk, the main slider configured to move in first and second directions corresponding to insertion and ejection of the disk, the eject lever configured to eject the disk inserted into the housing through the slot, and the interlocking slider.

23 Claims, 17 Drawing Sheets

OPTICAL DISK APPARATUS

CROSS-REFERENCE TO RELATED PATENT APPLICATION(S)

This application claims the benefit under 35 U.S.C. §119(a) of a Korean Patent Application No. 10-2008-0038896, filed on Apr. 25, 2008 in the Korean Intellectual Property Office, the disclosure of which is incorporated herein in its entirety by reference.

TECHNICAL FIELD

The following description relates to an optical disk apparatus, and more particularly, to a slot-in type optical disk apparatus.

BACKGROUND

Among various types of information storage media, optical disks have been widely used due to their relative large storage capacity and low fabrication costs. Optical disks may be classified according to their storage capacity and include compact disks (CDs) and digital versatile disks (DVDs). Based on ability to write, read, and reproduce data with respect to the disks, exemplary optical disks include 650 MB CD-R, CD-RW, 4.7 GB DVD-R, DVD+R, DVD-RW, and DVD+RW. Recently, HD-DVD and blue-ray disks having a storage capacity of 20 GB or greater have been developed.

Optical disks are used as information storage media for portable electronic devices such as laptop computers, camcorders, and the like. However, there may be problems associated with the use of a conventional optical disk apparatus in portable electronic devices. For example, the conventional optical disk apparatus is typically large in size, and a complicated cassette-type or tray-type apparatus is used to place an optical disk with respect to the apparatus in such electronic devices. Accordingly, a slot-in type optical disk apparatus has been developed where a disk may be automatically inserted or ejected through a slot formed in a front surface of the optical disk apparatus.

But with the portable electronic devices becoming smaller in size, there is now demand for a smaller and light-weight slot-in type optical disk apparatus. Since the diameters of optical disks are standardized, there is a limit in reducing the width of the optical disk apparatus, and accordingly, much attention has been paid to reduce the thickness of the optical disk apparatus. However, as an example, because many components to control the motions of a loading lever, an eject lever, and a disk guide are needed to load and unload an optical disk with respect to the optical disk apparatus, it has been difficult to reduce the thickness and weight of the optical disk apparatus.

SUMMARY

According to one general aspect, there is provided an optical disk apparatus including a housing having a slot to receive a disk, a main unit disposed in the housing and having a turn table to rotate the disk, a main slider configured to reciprocate in a direction corresponding to insertion and ejection of the disk, an interlocking slider configured to engage with the main slider to reciprocate in another direction in response to the reciprocating of the main slider, and a disk ejecting unit configured to eject the disk inserted in the housing through the slot.

The main slider may be configured to reciprocate in a direction parallel with insertion and ejection directions of the disk, and the interlocking slider may be configured to engage with the main slider to reciprocate in a direction perpendicular to a reciprocating direction of the main slider.

The disk ejecting unit may be directly connected to the interlocking slider.

The disk ejecting unit may rotate about a pivot axis that is separated from the interlocking slider and includes a protrusion that is separated from the pivot axis and interferes with the interlocking slider, and the interlocking slider may include a cam to receive the protrusion.

The disk ejecting unit may be elastically biased to eject the disk.

The cam may include a protrusion holding surface, which restrains the rotation of the protrusion where the disk rotates on the turn table.

The optical disk apparatus may further include a driving motor to drive the main slider, and a fourth switch to control the driving of the driving motor, wherein turning on/off of the fourth switch may depend upon a rotation angle of the disk ejecting unit.

The optical disk may further include a first connection lever to connect a movement of the main slider with a movement of the interlocking slider, and rotate in response to a movement, for example, a linear movement, of the main slider or the interlocking slider.

A side surface of the interlocking slider may face a side surface of the main unit, and a movement, for example, a linear movement, of the interlocking slider may cause the main unit to rise or descend with respect to the housing.

The main unit may include a boss protruding toward the side surface of the interlocking slider, and the interlocking slider may include a cam in which the boss is received and slid to be lifted.

A side surface of the main slider may face the side surface of the main unit, and a movement, for example, a linear movement, of the main slider may cause the main unit to rise or descend with respect to the housing.

The main unit may include a boss protruding toward the side surface of the main slider, and the main slider may include a cam in which the boss is received and slid to be lifted.

The optical disk apparatus may further include a disk guide to guide the disk inserted in the housing, wherein the disk guide includes a front edge that induces a center portion of the disk inserted in the housing toward the turn table, and the front edge of the disk guide is formed to rotate in communication with the interlocking slider.

The optical disk apparatus may further include a second connection lever to connect a movement of the interlocking slider with a movement of the front edge of the disk guide, and rotate in response to a movement, for example, a linear movement, of the interlocking slider.

The optical disk apparatus may further include a plurality of switches that are turned on/off according to a position of the main slider.

The plurality of switches may include a first switch to change a rotating direction of the driving motor after ejecting the disk through the slot, a second switch to stop a rotation of the driving motor in a standby status for insertion of the disk, and a third switch to stop a rotation of the driving motor and start a rotation of the turn table where the disk is inserted into the housing.

The first through third switches may be arranged in a row along a proceeding direction of the main slider, and the second and third switches may be arranged at different heights from each other.

The optical disk apparatus may further include a loading lever to compress the disk so that a center portion of the disk inserted in the housing reaches the turn table in conjunction with a movement of the main slider.

The optical disk apparatus may further include a shock absorber to prevent the disk ejecting unit and the interlocking slider from being damaged where the disk is inserted.

The optical disk apparatus may further include a manual disk ejecting unit to eject the disk from the housing in response to the main slider being operated manually.

The optical disk apparatus may further include a shutter to open and close the slot in conjunction with a movement of the main slider.

According to another aspect, there is provided an optical disk apparatus to record and/or read with respect to a disk, the apparatus including a housing configured to define the optical disk apparatus and having a slot to receive the disk, a main unit having a turn table to rotate the disk and an optical pickup to record and/or read with respect to the disk, a main slider configured to move in first and second directions corresponding to insertion and ejection of the disk, a disk ejecting unit configured to eject the disk inserted into the housing through the slot, and an interlocking slider configured to engage with the main slider to drive the disk ejecting unit.

The interlocking slider may be connected to the disk ejecting unit to directly drive the disk ejecting unit.

The interlocking slider may be connected to the disk ejecting unit to directly drive the disk ejecting unit and a boss for performing a disk chucking operation.

Other features and aspects will be apparent from the following detailed description, the drawings, and the claims.

Figure 1:
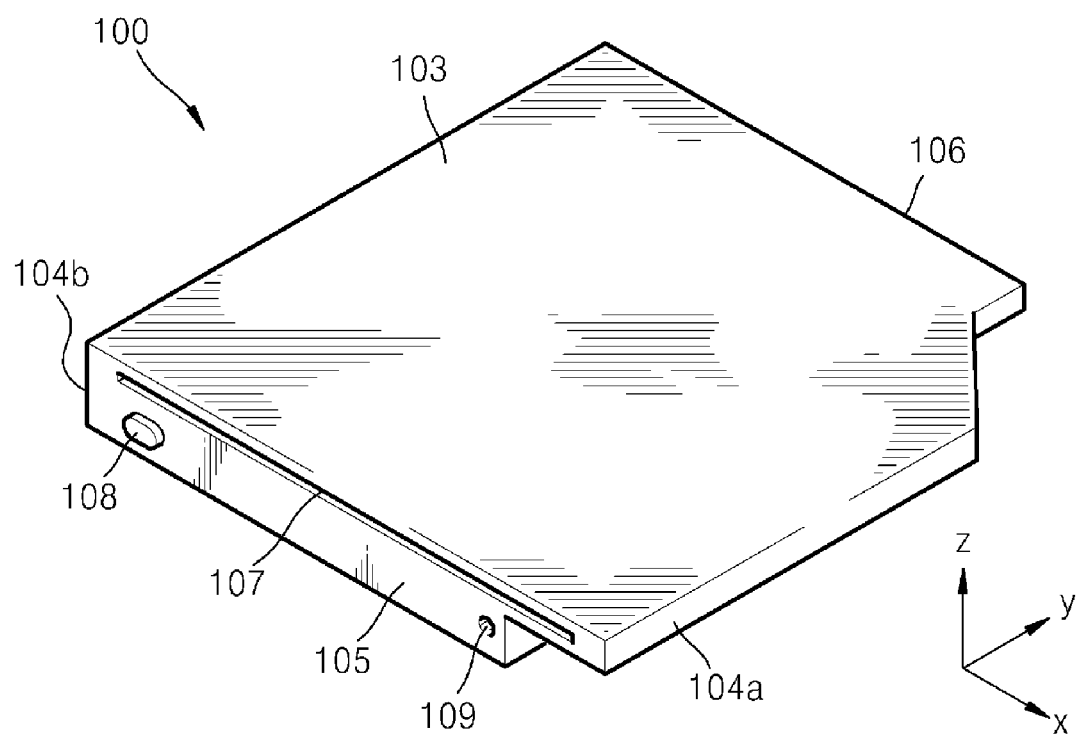
FIG. 1 is a diagram illustrating a perspective view of an exemplary optical disk apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION OF THE INVENTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 shows an exemplary optical disk apparatus 100. Referring to FIG. 1, the optical disk apparatus 100 includes a housing that includes a base 101 (refer to FIG. 2) and a cover 103 coupled to the base 101. A slot 107, through which a disk D (refer to FIG. 2) is inserted/ejected, and an eject hole 109 are formed in a front surface 105 of the housing. Also, an eject button 108 is provided in the front surface 105. In response to the eject button 108 being pushed, the disk D loaded in the optical disk apparatus 100 is unloaded. When a power source is turned off in a state where the disk D is loaded in the optical disk apparatus 100 or when the disk D is not unloaded at ease even where the power source is not turned off, a pin (not shown) may be inserted into the eject hole 109 to move a main slider 160 (refer to FIG. 5A) so as to unload the disk D. As an illustration only, the optical disk apparatus 100 may be installed in portable devices such as laptop computers, camcorders, and the like.

Figure 2:
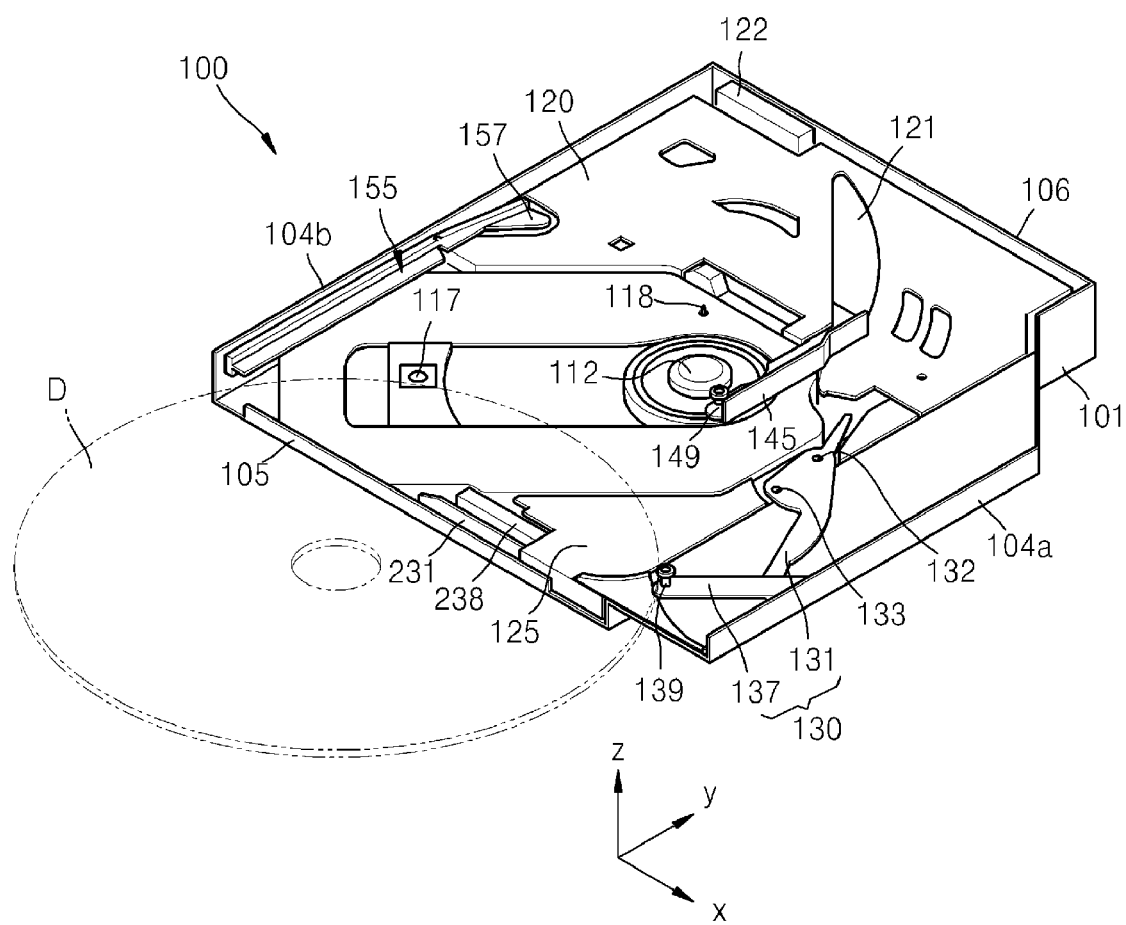
FIG. 2 is a diagram illustrating a perspective view of the optical disk apparatus of FIG. 1 in a reset status, with a cover removed.
Figure 3:
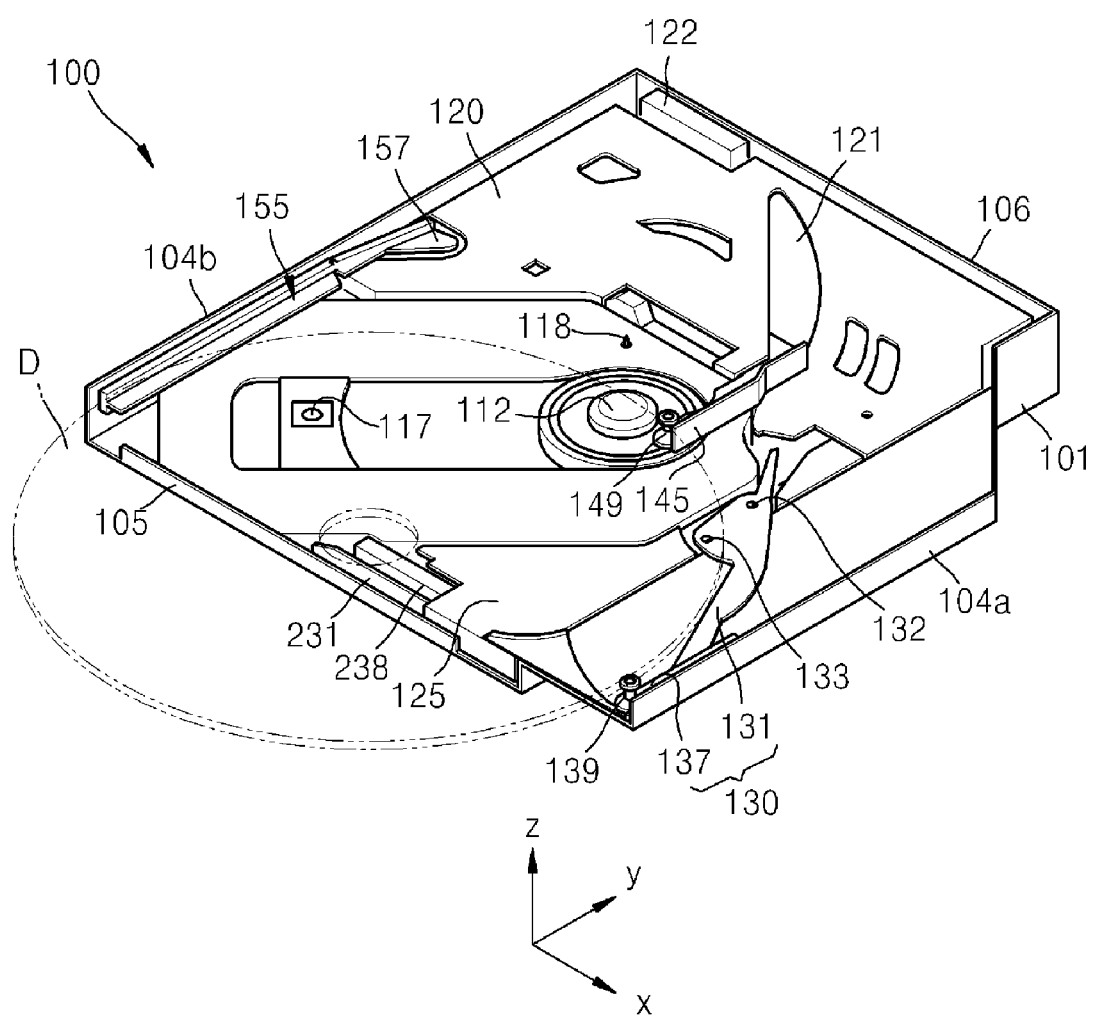
FIG. 3 is a diagram illustrating a perspective view of the optical disk apparatus of FIG. 1 with an optical disk being inserted therein, with a cover removed.
Figure 4:
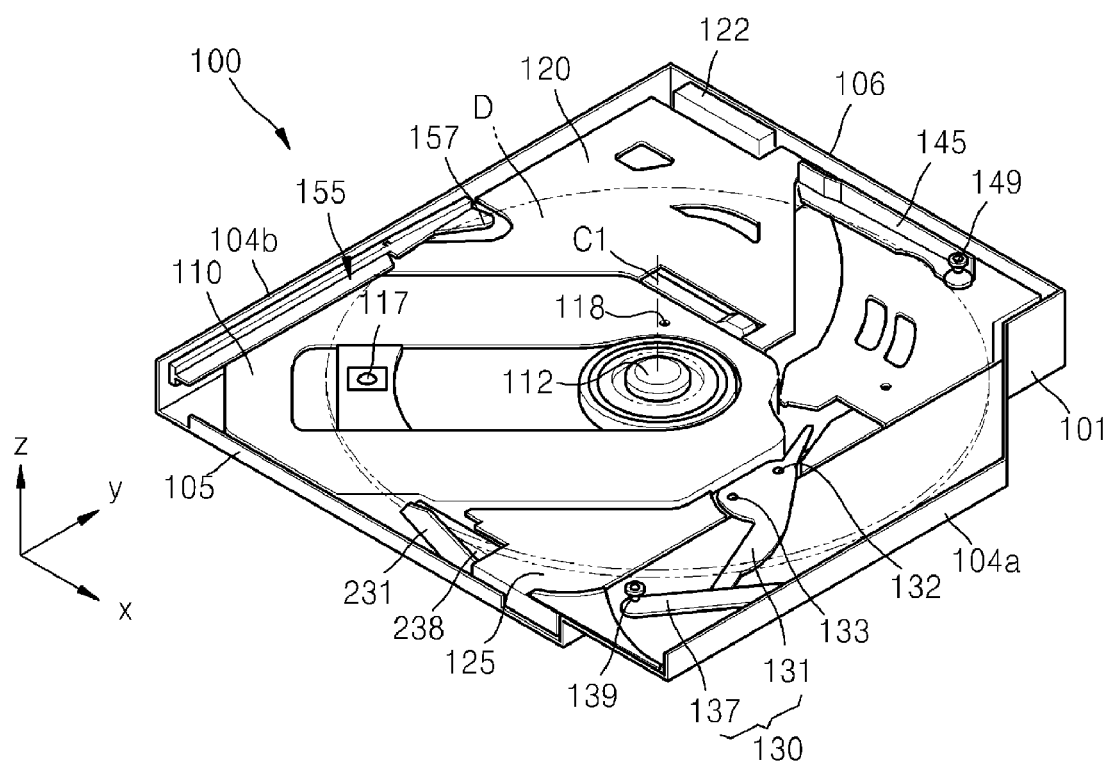
FIG. 4 is a diagram illustrating a perspective view of the optical disk apparatus of FIG. 1 with an optical disk chucked therein, with a cover removed.

FIG. 2 shows the optical disk apparatus of FIG. 1 in a reset status, FIG. 3 shows the optical disk apparatus of FIG. 1 where a disk D is being inserted therein, and FIG. 4 shows the optical disk apparatus of FIG. 1 after the disk D is fully inserted therein.

Referring to FIGS. 2 through 4, the optical disk apparatus 100 further includes a main unit 110, a loading lever 130, an eject lever 145, and a disk guide 155. The main unit 110 includes a turn table 112, on which the disk D is mounted, a spindle motor (not shown) to rotate the turn table 112 at a predetermined speed, an optical pickup 117 to irradiate light onto the disk D so as to record or reproduce data with respect to the disk D, and a feeding motor (not shown) to move the optical pickup 117 in a radial direction of the disk D.

The loading lever 130 presses the disk D so that a center portion of the disk D, which is inserted through the slot 107 (refer to FIG. 1), may reach the turn table 112. The loading lever 130 is pivotably supported by a second chassis 125 that supports the main slider 160 (refer to FIG. 5A). The loading lever 130 includes a first rod 131 that is fixed onto the second chassis 125 and pivot about a pivot axis 132, and a second rod 137 connected to a front edge of the first rod 131.

The eject lever 145 escapes toward a rear surface 106 of the optical disk apparatus 100 so as not to interfere with the disk D where the disk D is inserted into the housing through the slot 107 (refer to FIG. 4), and where the eject button 108 (refer to FIG. 1) is pushed, the eject lever 145 rotates in, for example, a clockwise direction based on a pivot axis 146 (refer to FIG. 7A) and compresses the disk D so as to eject the disk D through the slot 107. The eject lever 145 is pivotably supported by a first chassis 120, and elastically biased so that a disk contact roller 149, which is located on a front edge of the eject lever 145, may be close to the turn table 112. An opening 121 formed in the first chassis 120 allows the eject lever 145 to rotate therein. The disk guide 155 guides the disk D, which is inserted into the optical disk apparatus 100 or ejected from the optical disk apparatus 100, and a front edge portion 157 of the disk guide 155 is slightly bent toward the turn table 112 so that the center portion of the disk D inserted into the optical disk apparatus 100 and a rotary shaft C1, (refer to FIG. 4) of the turn table 112 match each other.

Where power is applied to the optical disk apparatus 100 and the optical disk apparatus 100 is in a reset status in which the optical disk apparatus 100 is ready to receive the disk D through the slot 107 (refer to FIG. 1), a disk contact roller 139 located on a front edge of the second rod 137 is moved toward the center portion of the slot 107 as shown in FIG. 2. Meanwhile, the disk contact roller 139 is pushed toward a left side surface 104a of the base 101 by an outer circumferential surface of the disk D until about half of the disk D is inserted through the slot 107 into the optical disk apparatus 100 as shown in FIG. 3, and thus, the disk contact roller 139 does not interfere with the insertion of the disk D.

Referring to FIG. 4, where the center portion of the disk D that is inserted through the slot 107 (refer to FIG. 1) reaches the turn table 112, the main unit 110 rises so that an unchucking rod 118 protruded from the base 101 is hidden by the main unit 110. At this time, the disk D is chucked on the turn table 112, and the disk D may rotate in response to the rotation of the turn table 112. The disk contact roller 139 of the loading lever 130 and the disk contact roller 149 of the eject lever 145 are separated from the outer circumferential portion of the disk D so as not to interfere with the rotation of the disk D, and the front edge 157 of the disk guide 155 is separated from the outer circumferential portion and moved to a right side surface 104b of the base 101. Where the disk D is chucked, a shutter 231 closes the slot 107 (refer to FIG. 1).

Where the eject button 108 (refer to FIG. 1) is pushed, the main unit 110 descends, and the unchucking rod 118 protrudes out of the main unit 110 so as to unchuck the disk D, open the slot 107, rotate the eject lever 145 in, for example, the clockwise direction, and eject the disk D out of the slot 107. Reference numeral 122 is a connector to connect the optical disk apparatus 100 to another electronic device such as, for example, a main board of a computer.

Figure 5A:
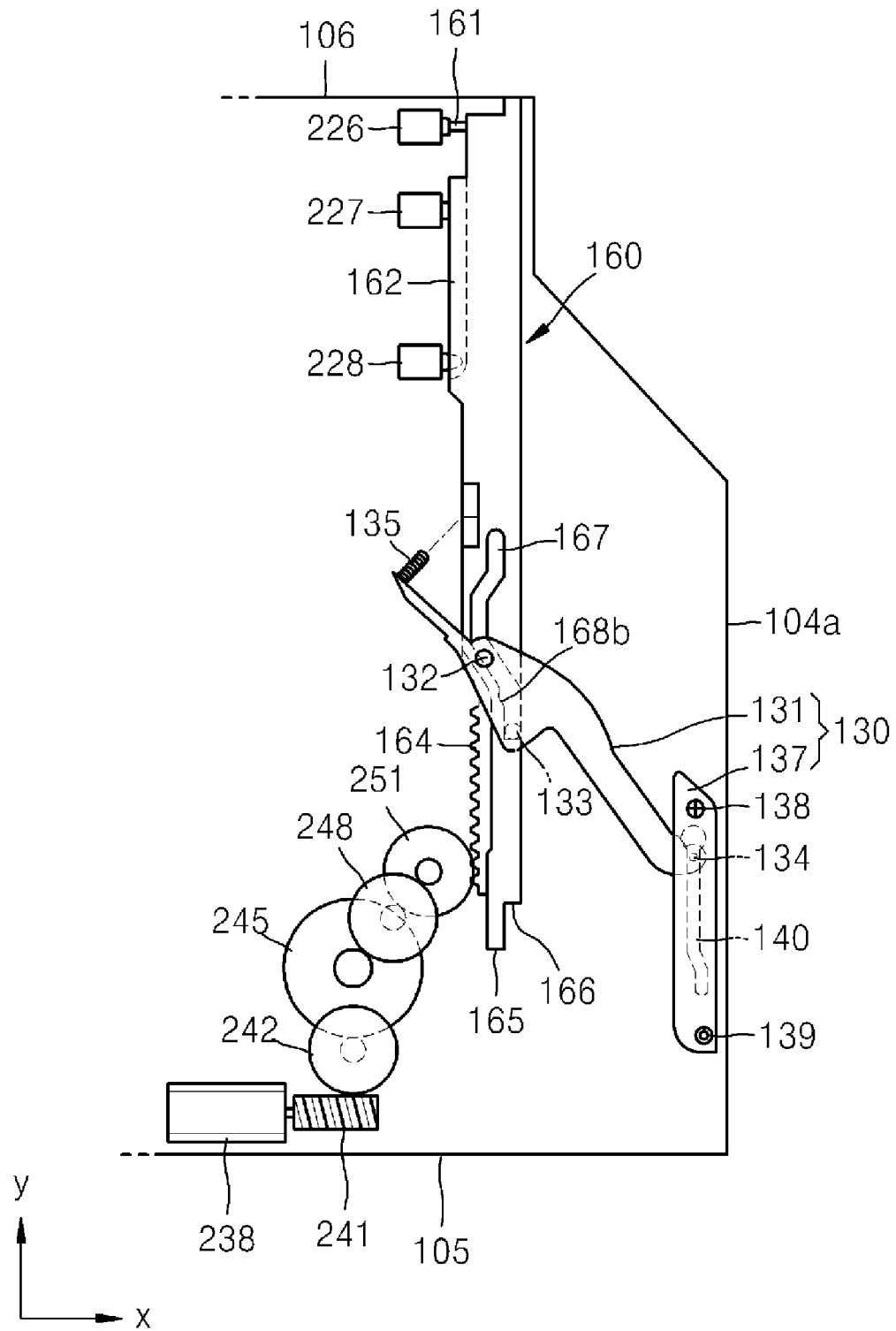
FIGS. 5A through 5E are diagrams illustrating plan views to show the movements of a main slider and a loading lever in the optical disk apparatus of FIG. 1.
Figure 5B:
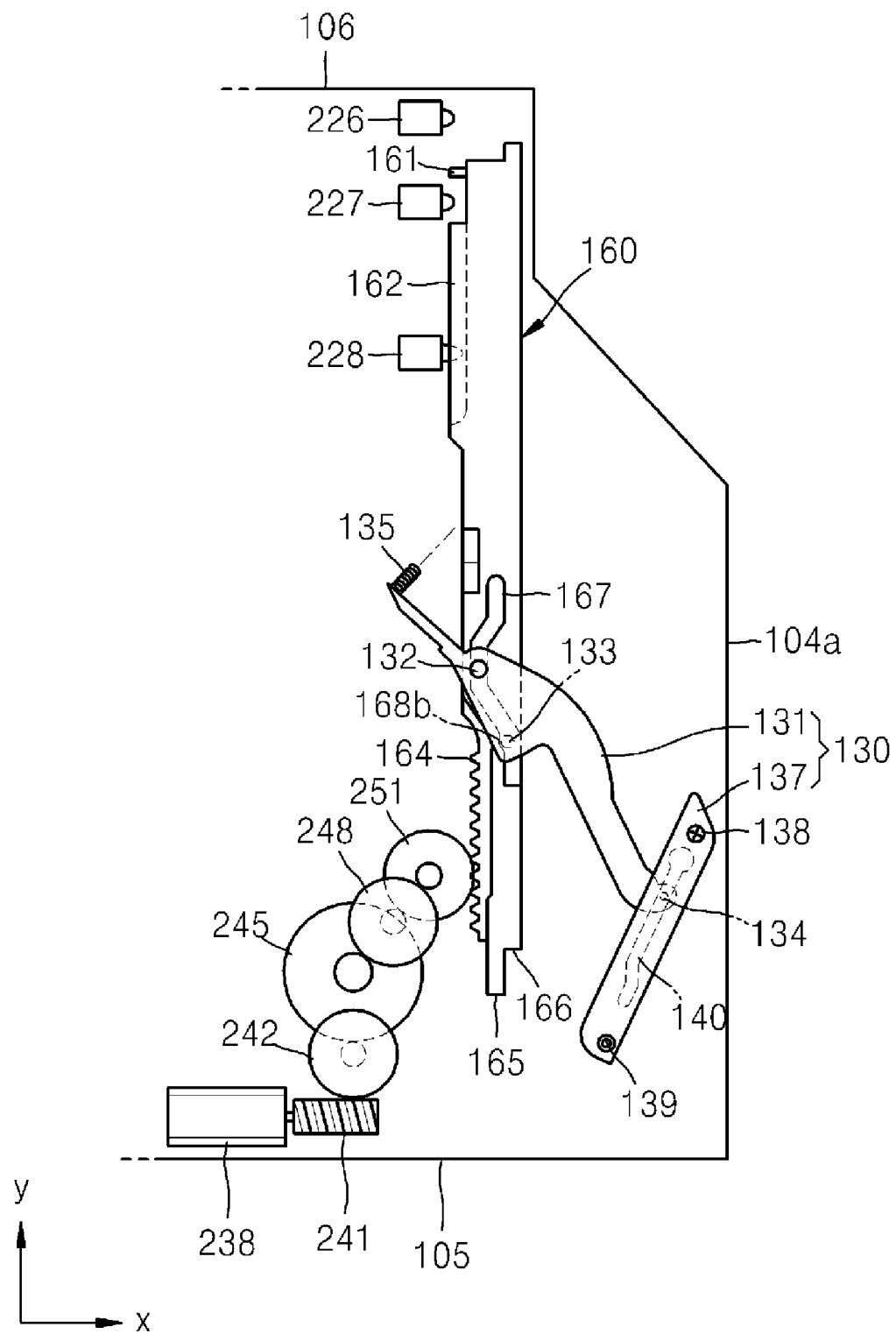
Figure 5C:
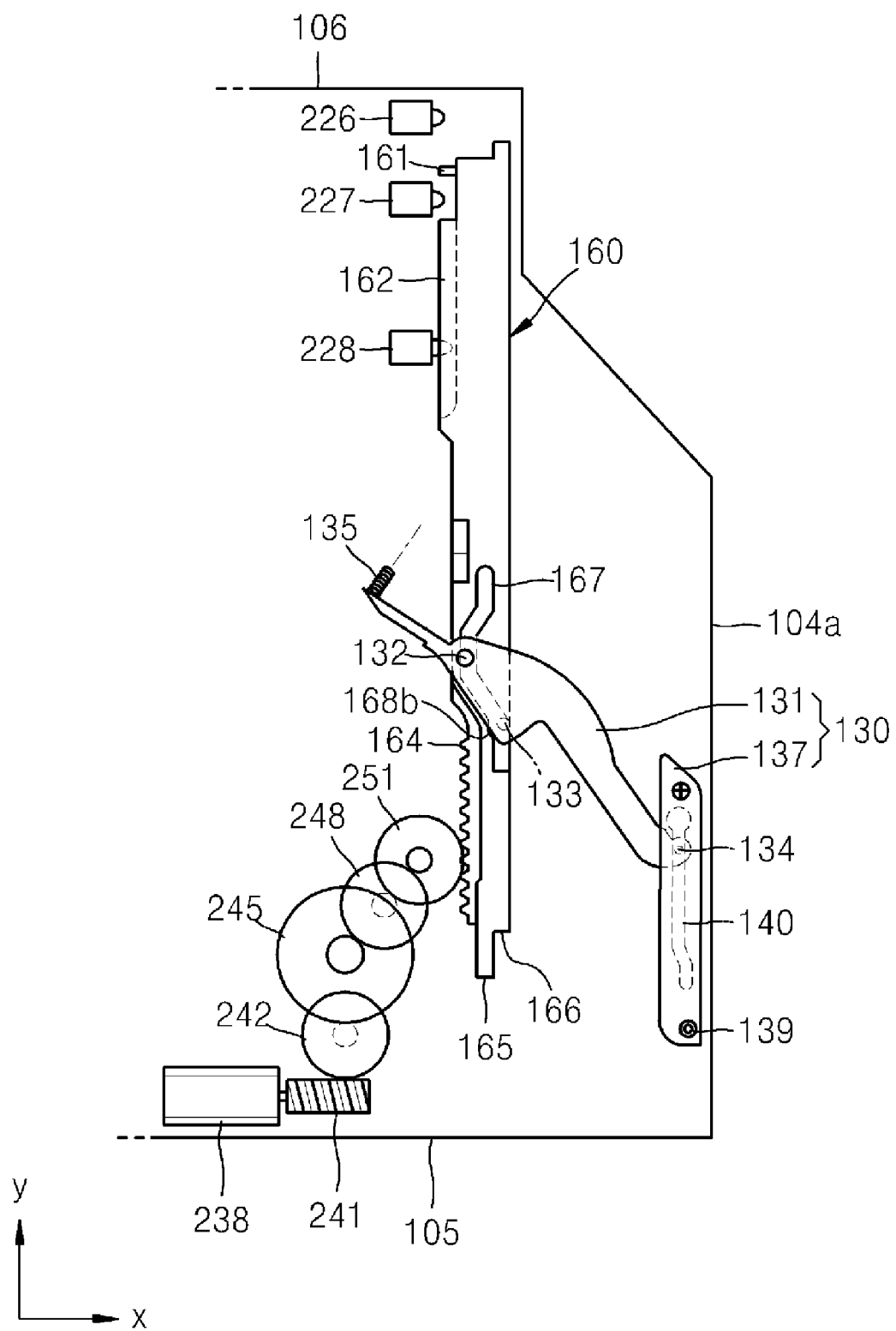
Figure 5D:
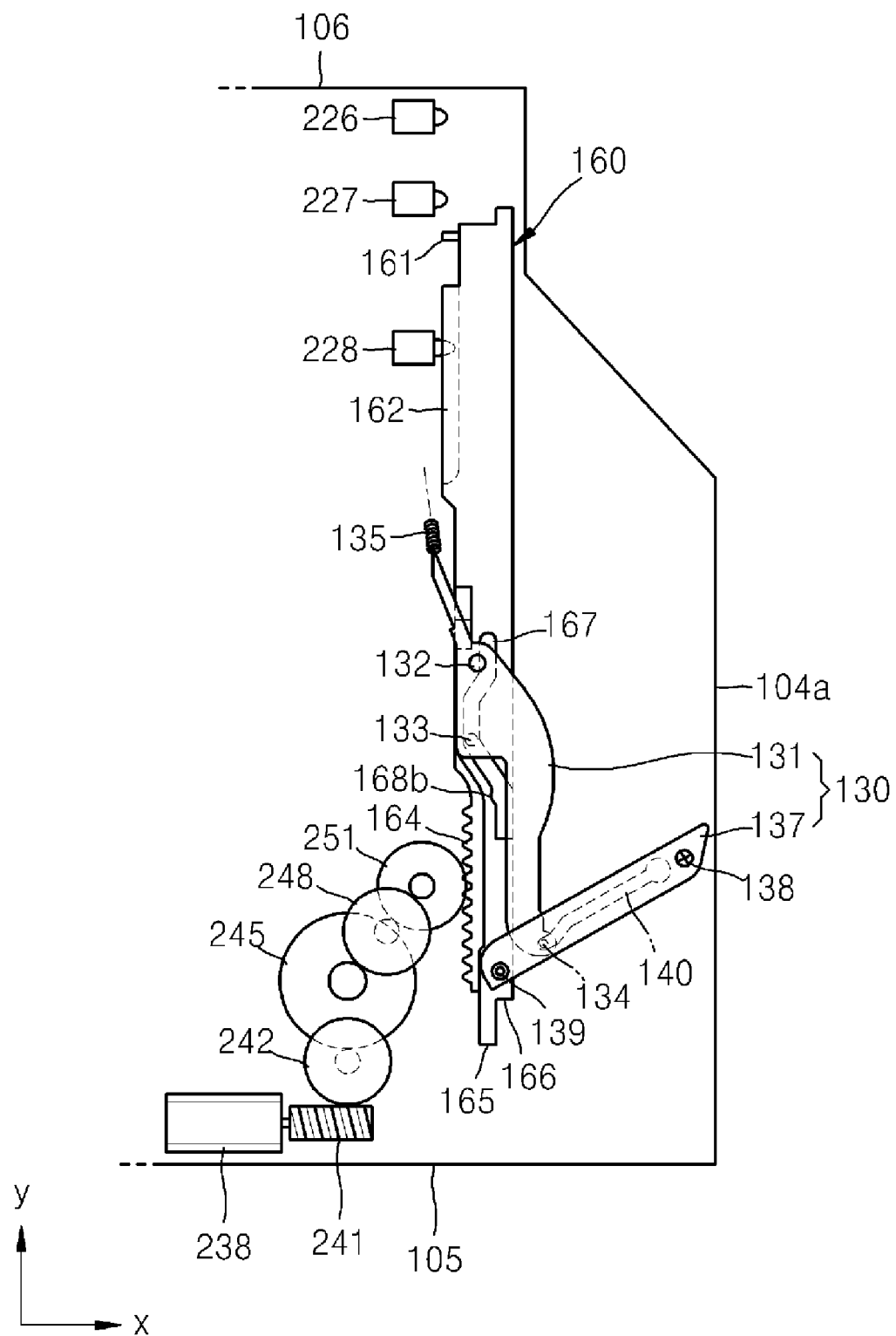
Figure 5E:
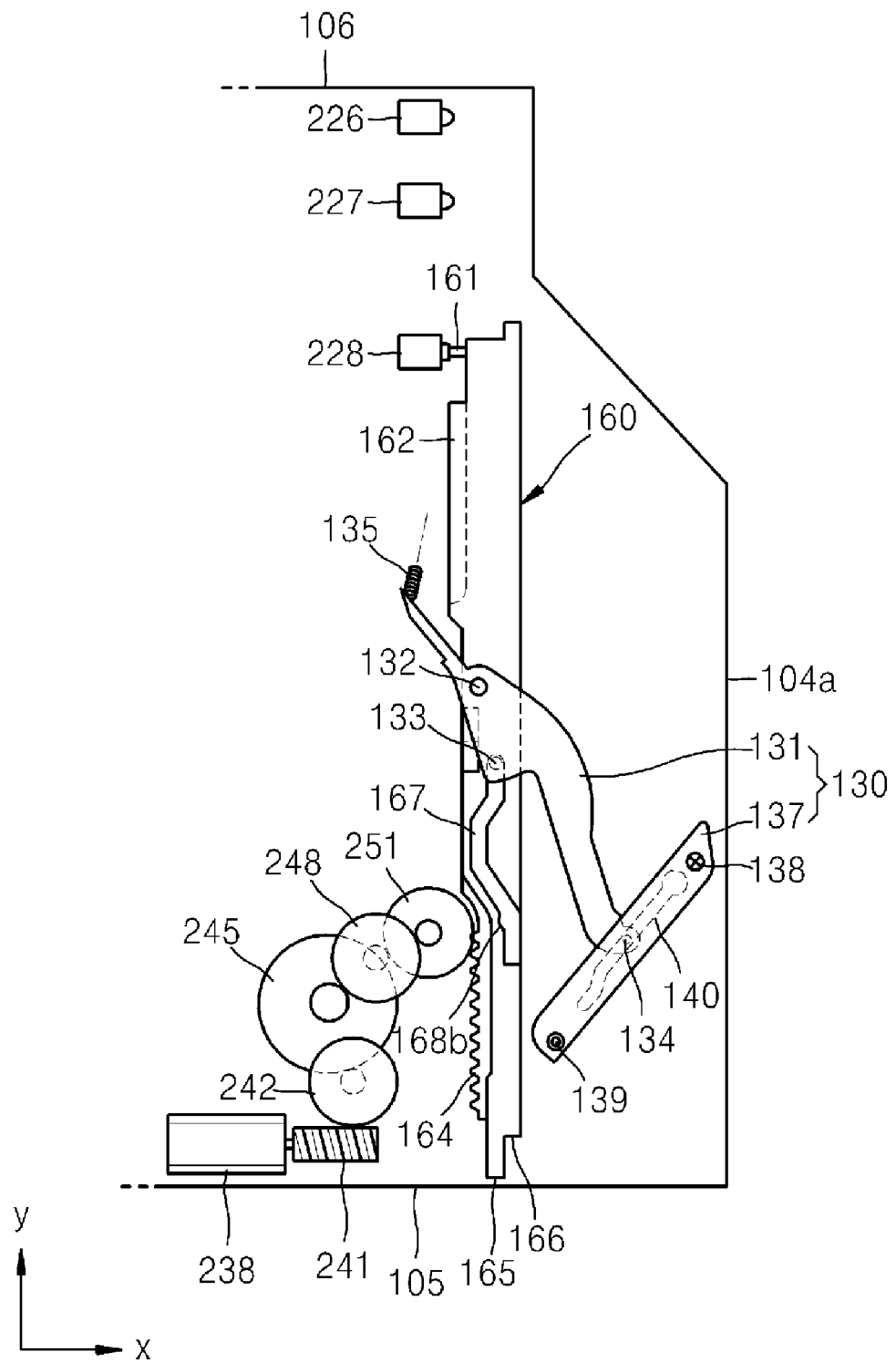
Figure 5F:
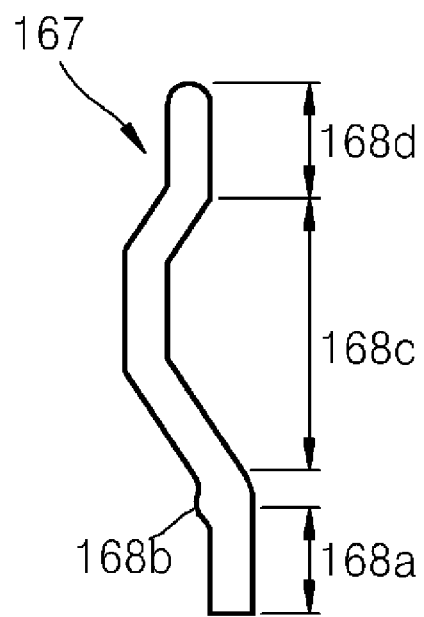
FIG. 5F is a diagram illustrating an enlarged plan view of a third cam in contact with the main slider of FIGS. 5A through 5E.

FIGS. 5A through 5E illustrate the movements of a main slider and a loading lever in the optical disk apparatus shown in FIG. 1, FIG. 5F shows a third cam in contact with the main slider of FIGS. 5A through 5E, and FIG. 6 shows a height difference between first through third switches shown in FIGS. 5A through 5E.

The loading and unloading of the disk D (refer to FIG. 2) are performed via a driving motor 238 (refer to FIG. 5A) and the main slider 160) (refer to FIG. 5A), and other components engaged with the driving motor 238 and the main slider 160. FIG. 5A shows locations of the main slider 160 and the loading lever 130 where the ejecting operation of the disk D (refer to FIG. 2) is finished. Referring to FIG. 5A, the main slider 160 disposed under the second chassis 125 (refer to FIG. 2) extends in a y-direction so that an end portion of the main slider 160 may contact the rear surface 106 of the optical disk apparatus 100. A first switch 226, a second switch 227, and a third switch 228 are arranged in a row along with a length direction of the main slider 160, and the main slider 160 drives the first switch 226.

Figure 6:
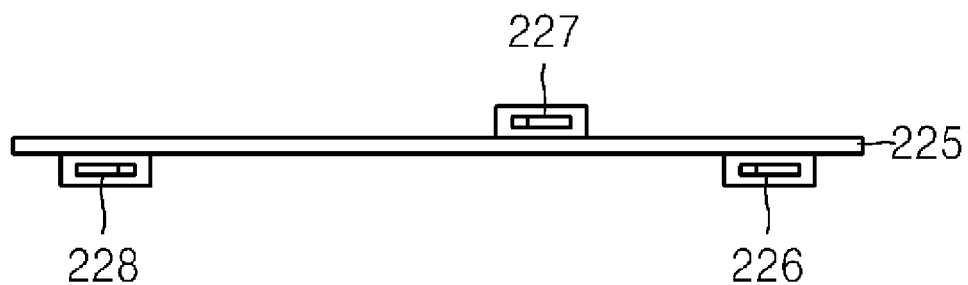
FIG. 6 is a diagram illustrating a side view showing a height difference between the first through third switches shown in FIGS. 5A through 5E.

As shown in FIG. 6, the first switch 226 and the third switch 228 are attached on a lower surface of a circuit board 225, and the second switch 227 is attached on an upper surface of the circuit board 225. Therefore, there is a height difference between the second switch 227 and the first and third switches 226 and 228. The main slider 160 includes a lower switch driver 161 at a height corresponding to the position at which the first and third switches 226 and 228 are disposed, and an upper switch driver 162 at a height corresponding to the position at which the second switch 227 is disposed. In FIG. 5A, where ejection of the disk D is finished, the lower switch driver 161 drives the first switch 226, and the upper switch driver 162 drives the second switch 227. The third switch 228 is not driven due to the height difference between the third switch 228 and the upper switch driver 162.

The main slider 160 includes a pusher 165 to open the shutter 231 (refer to FIG. 2) and a compression surface 166 that is pressed by a pin (not shown) during a forced ejecting operation of the disk D on the other end portion of the main slider 160. In addition, the main slider 160 includes a rack gear 164 so as to receive a driving power of the driving motor 238, and a third cam 167 to interlock the movement of the loading lever 130 with the linear movement of the main slider 160 on an upper surface of the main slider 160. The third cam 167 is formed as a groove extending in a predetermined path, and receives a third cam follow-up boss 133 that protrudes downward from the first rod 131 of the loading lever 130.

Referring to FIG. 5F, the third cam 167 includes a first straight path 168a and a second straight path 168d extending in a length direction of the main slider 160, a bent path 168c connecting the two straight paths 168a and 168d, and a reset surface 168b formed between the first straight path 168a and the bent path 168c. The first straight path 168a is closer to the left side surface 104a of the base 101 than the second straight path 168d.

The second rod 137 of the loading lever 130 is pivotably fixed on the base 101 (refer to FIG. 2). The pivot axis 138 is formed on an end portion of the second rod 137, the disk contact roller 139 is disposed on the other end portion of the second rod 127, and a second rod cam 140 of an elongated hole is formed between the pivot axis 138 and the disk contact roller 139. The connection member 134 formed on an end portion of the first rod 131 is received in the second rod cam 140. The other end portion of the first rod 131 is elastically biased by a spring 135 in, for example, the clockwise direction. An end portion of the spring 135 is connected to the other end portion of the first rod 131, and the other end portion of the spring 135 is connected to the second chassis 125 (refer to FIG. 2).

Where the ejecting of the disk D is finished, the third cam follow-up boss 133 of the first rod 131 is located on the first straight path 168a, and thus, the first rod 131 is close to the left side surface 104a of the base 101. Therefore, the disk contact roller 139 of the second rod 137 is close to the left side surface 104a.

FIG. 5B shows the optical disk apparatus 100 in a reset status. In the reset status, the optical disk apparatus 100 is ready to receive a new disk D after the disk D (refer to FIG. 2) is ejected or the optical disk apparatus 100 (refer to FIG. 2) is powered. In the status shown in FIG. 5A, the driving motor 238 starts to rotate in a direction by the driving of the first switch 226, and the main slider moves toward the front surface 105, that is, toward a negative direction in the y-axis. As shown in FIG. 5B, where the upper switch driver 162 escapes from the second switch 227 due to the movement of the main slider 160, the second switch 27 is turned off, and the driving motor 238 stops rotating. In the reset status, the third cam follow-up boss 133 of the first rod 131 is located on a reset surface 168b of the third cam 167. Since the first rod 131 is slightly rotated in the clockwise direction by the spring 135 and the cam follow-up boss 133 contacts the reset surface 168b, the connection member 134 of the first rod 131 is separated more from the left side surface 104a than the connection member 134 of FIG. 5A. Therefore, the disk contact roller 139 of the second rod 137 is separated from the left side surface 104a of the base 101. Where the disk D is inserted through the slot 107 (refer to FIG. 1) in a state where the loading lever 130 is located at the position shown in FIG. 5B, the outer circumferential portion of the disk D contacts the disk contact roller 139 (refer to FIG. 2).

FIG. 5C shows the state of the optical disk apparatus 100 where the center portion of the disk D passes through the slot 107 (refer to FIG. 1) after the disk D is inserted through the slot 107. As the disk D is inserted in the optical disk apparatus 100, the outer circumferential surface of the disk D pushes the disk contact roller 139 to the left side surface 104a. Since the third cam follow-up boss 133 of the first rod 131 may be slightly rotated in a counter-clockwise direction due to a clearance of the third cam 167 around the reset surface 168b, the second rod 137 may rotate until the disk contact roller 139 is close to the left side surface 104a again.

FIG. 5D shows the center portion of the disk D inserted into the optical disk apparatus 100 (refer to FIG. 1). Here, a fourth switch 229 (refer to FIG. 7B) is driven so as to rotate the driving motor 105 again, and thus, the main slider 160 is moved toward the front surface 105. Due to the movement of the main slider 160, the third cam follow-up boss 133 of the first rod 131 moves along the bent path 168c of the third cam 167, and thus, the first rod 131 pivots about the pivot axis 132 in, for example, the clockwise direction, and the second rod 137 engaged with the first rod 131 pivots about the pivot axis 138 in the clockwise direction. Therefore, the disk contact roller 139 compresses the disk D so as to insert the disk D into the optical disk apparatus 100.

FIG. 5E shows a status where the disk D is chucked on the turn table 112 (refer to FIG. 4). Here, the main slider 160 moves until the pusher 165 of the main slider 150 contacts the front surface 105, and the lower switch driver 161 drives the third switch 228. The driving motor 105 stops rotating due to the operation of the third switch 228, and the turn table 112 may start to rotate the disk D. Where the disk D is chucked, the third cam follow-up boss 133 is located on the second straight path 168d of the third cam 167. Accordingly, the first rod 131 slightly pivots about the pivot axis 132 in the counter-clockwise direction, and the second rod 137 linking to the first rod 131 slightly pivots about the pivot axis 138 in the counter-clockwise direction. Therefore, the disk contact roller 139 is separated from the outer circumferential surface of the disk D so as not to intererfere with the rotation of the disk D.

When the eject button 108 (refer to FIG. 1) is pushed, the turn table 112 stops rotating, and the ejecting of the disk D starts. For example, the disk D may be ejected in a reverse order of the insertion operation of the disk D, described with reference to FIGS. 5A through 5E, and accordingly, descriptions thereof will be omitted for conciseness.

Figure 7A:
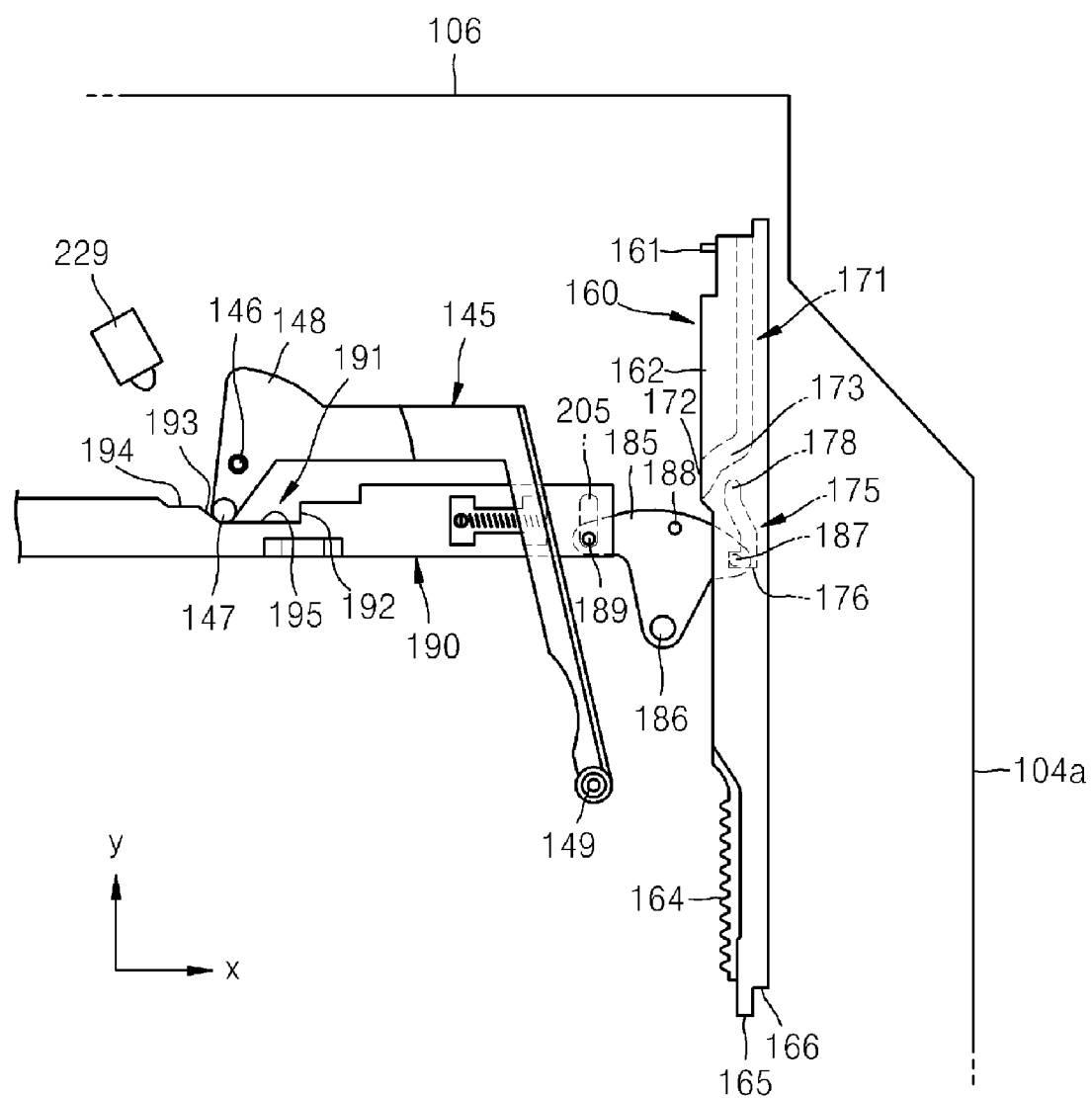
FIGS. 7A through 7C are diagram illustrating plan views sequentially showing the movements of a main slider, a interlocking slider, and an eject lever in the optical disk apparatus of FIG. 1.
Figure 7B:
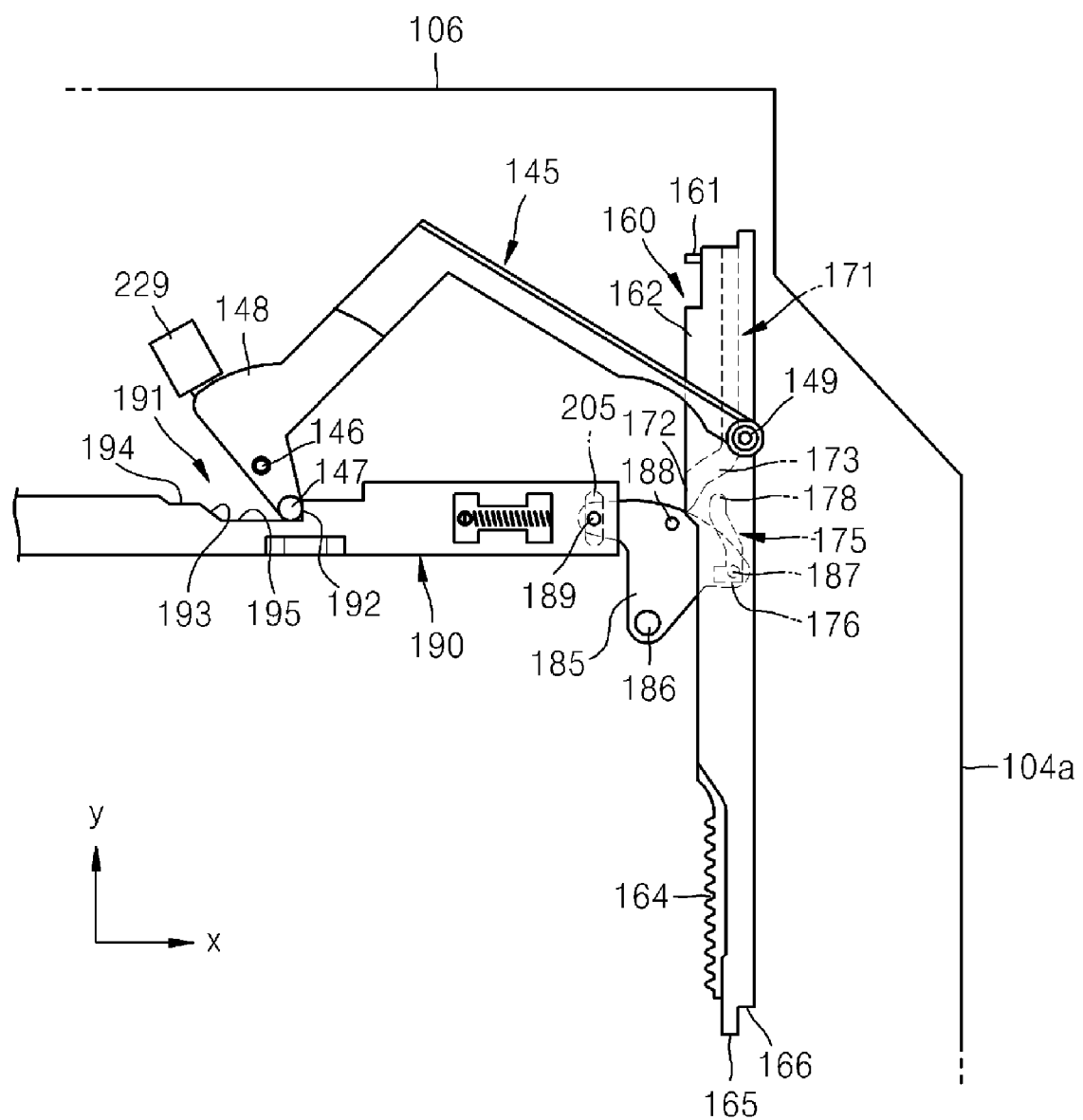
Figure 7C:
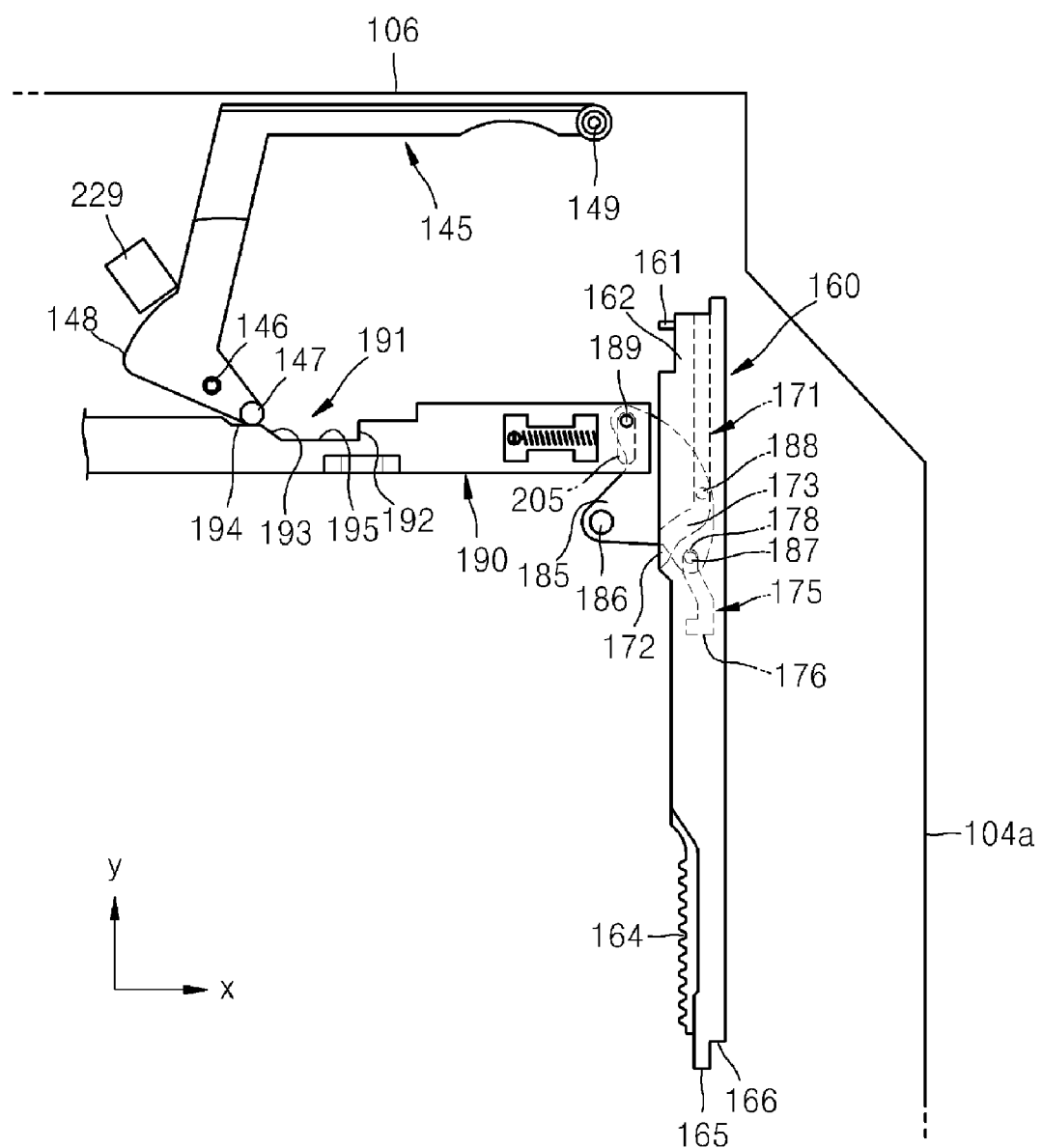
Figure 8:
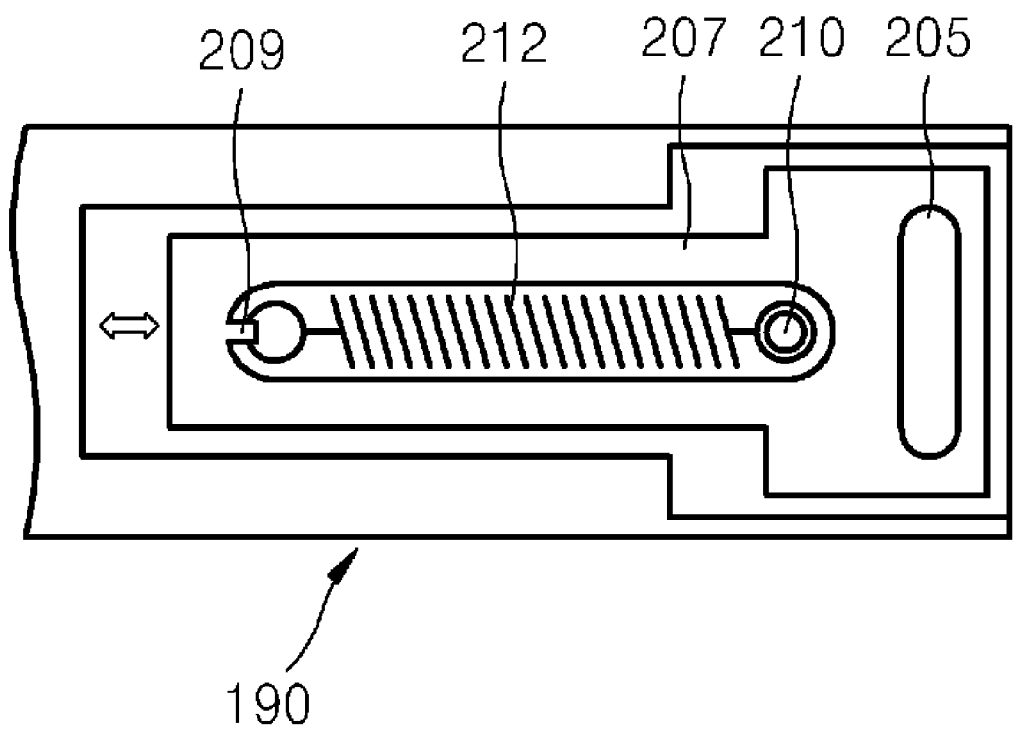
FIG. 8 is a diagram illustrating a bottom view showing a shock absorber mounted on an auxiliary slider shown FIGS. 7A through 7C.

FIGS. 7A through 7C sequentially show the movements of a main slider, a interlocking slider, and an eject lever in the optical disk apparatus 100 of FIG. 1, and FIG. 8 shows a shock absorber mounted on an auxiliary slider shown FIGS. 7A through 7C.

Referring to FIG. 7A, the main slider 160 includes a first cam 171 and a second cam 175 on a lower surface thereof. The first cam 171 is formed as a groove extending in a predetermined path, has an open end on a side surface of the main slider 160, and receives a second boss 188 of a first connection lever 185, which is pivotably fixed about a pivot axis 186 on the base (101, refer to FIG. 2). The second cam 175 is formed as a groove extending in a predetermined direction that is closed, and receives a first boss 187 of the first connection lever 185. Where the ejection of the disk D is finished, the first boss 187 is located on a side end 176 of the second cam 175, and a second boss 188 of the first connection lever 185 is located outside of the first cam 171.

A third boss 189 of the first connection lever 185 is received in a boss-receiving elongated hole 205 of an interlocking slider 190. The interlocking slider 190 moves in a direction (x-axis direction) crossing the moving direction (y-axis direction) of the main slider in conjunction with the movement of the main slider 160, and is slidably supported by the first chassis 120 (refer to FIG. 2). The interlocking slider 190 includes a seventh cam 191 to connect the rotation of the eject lever 145 with the linear movement of the interlocking slider 190. The seventh cam 191 includes a first stepped surface 192 that is stepped to the inside of the interlocking slider 190, a second stepped surface 193 separated from the first stepped surface 192 with a clearance 195 and stepped with inclination, and a protrusion holding surface 194 close to the second stepped surface 193.

The eject lever 145 is, for example, an L-shaped member that is rotatably supported by the first chassis 120, and includes a protrusion 147 that is received by the seventh cam 191 of the interlocking slider 190 on a side that is separated from the pivot axis 146. A fourth switch driver 148 for driving the fourth switch 229 mounted on the circuit board 225 is placed on an opposite side of the protrusion 147. As shown in FIG. 7A, where the ejecting of the disk D is finished, the protrusion 147 is received between the first stepped surface 192 and the second stepped surface 193, and the fourth switch driver 148 is separated from the fourth switch 229. Although it is not shown in the drawings, the eject lever 145 may be elastically biased by a spring (not shown) based on the pivot axis 146 in the clockwise direction, however, the eject lever 145 may not be rotated further than the position shown in FIG. 7A in the clockwise direction due to the limitation of the opening 121 (refer to FIG. 2) formed in the first chassis 120.

FIG. 7B shows a status where the disk D is inserted into the optical disk apparatus 100 through the slot 107 (refer to FIG. 1) and the eject lever 145 is pushed toward the rear surface 106 by the outer circumferential portion of the disk D. Referring to FIG. 7B, as the disk D enters the optical disk apparatus 100, the eject lever 145 is rotated in the counter-clockwise direction about the pivot axis 146. Therefore, the protrusion 147 moves in a positive direction of the x-axis along the clearance 195 of the seventh cam 191. Since the fourth switch driver 148 drives the fourth switch 229 due to the rotation of the eject lever 145, the driving motor 138 (refer to FIG. 5D) starts to rotate. The main slider 160 starts to move toward the front surface 105 (refer to FIG. 5D) by the driving force of the driving motor 238.

In the status shown in FIG. 7B, the main slider 160 moves toward the front surface 105 due to the rotation of the driving motor 238, the first connection lever 185 engaged with the main slider 160 rotates in the clockwise direction, and the interlocking slider 190 engaged with the first connection lever 185 moves in the positive direction of the x-axis. The eject lever 145 rotates in the counter-clockwise direction due to the disk D, and thus, the disk contact roller 149 escapes toward the rear surface 106 of the base 101.

FIG. 7C shows a status where chucking of the disk D is finished. Where the chucking of the disk D is finished, the protrusion 147 is supported by the protrusion holding surface 194 of the seventh cam 191, and thus, the separated state of the disk contact roller 149 from the outer circumferential surface of the disk D is maintained. In addition, the first boss 187 moves from a side 176 of the second cam 175 to the other side to be located at a dead end 178. In addition, the second boss 188 enters an inclined path 173 of the first cam 171 through an opening 172 of the first cam 171, and then, proceeds along the inclined path 173 to be separated from the opening 172, and a third boss 189 moves to the uppermost portion of the boss-receiving elongated hole 205. As described with reference to FIG. 5E, since the third switch 228 is driven where the chucking of the disk D is finished, the movement of the main slider 160 is stopped, and the turn table 112 (refer to FIG. 2) starts to rotate. Where the eject button 108 (refer to FIG. 1) is pushed, the turn table 112 stops rotating and the ejecting operation of the disk D starts. The ejection of the disk D may be performed in inverse reverse order of the insertion of the disk D, which is described with reference to FIGS. 7A through 7C, and thus, further descriptions thereof will be omitted for conciseness.

Where the disk D is rapidly inserted through the slot 107 (refer to FIG. 1), the interlocking slider 190 and the eject lever 145 may be damaged. To prevent this, the interlocking slider 190 includes a shock absorber. Referring to FIG. 8, the shock absorber includes a shock absorbing bracket 207, in which the boss-receiving elongated hole 205 is formed, and a spring 212. The shock absorbing bracket 207 is mounted on the interlocking slider 190 to slid in directions denoted by an arrow in FIG. 8, and a side of the spring 212 is supported by a spring supporter 209 formed in the shock absorbing bracket 207 and the other side of the spring 212 is supported by a supporter 210 formed in the interlocking slider 190. Where the interlocking slider 190 is suddenly moved from the stopped status, the spring 209 is compressed to absorb the shock, so as to prevent the interlocking slider 190 and the eject lever 145 from being damaged.

Figure 9A:
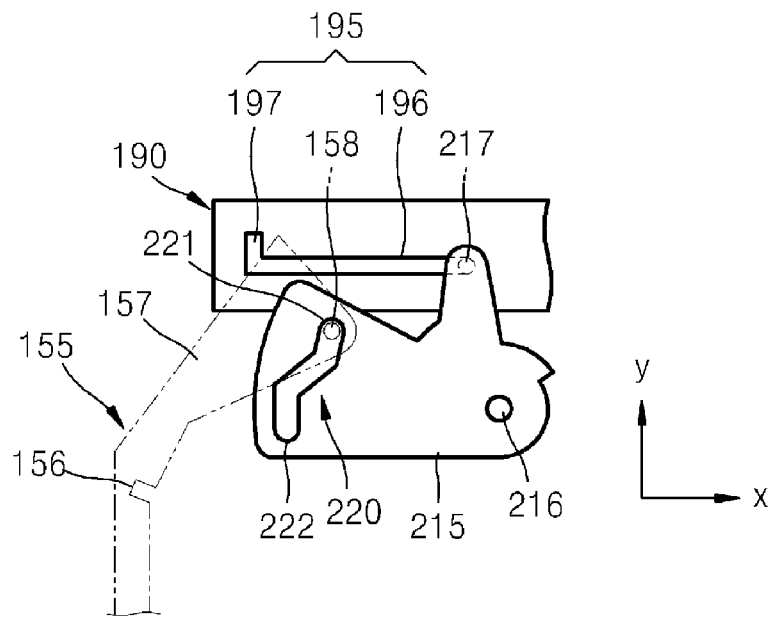
FIGS. 9A and 9B are diagram illustrating plan views sequentially showing the movements of the interlocking slider and a disk guide in the optical disk apparatus of FIG. 1.
Figure 9B:
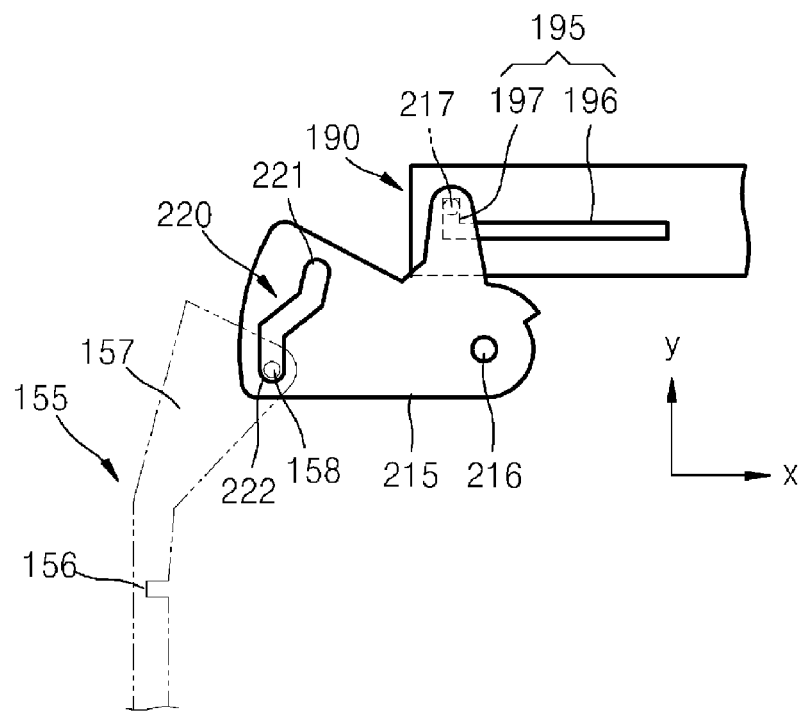

FIGS. 9A and 9B sequentially show the movements of the interlocking slider and a disk guide in the optical disk apparatus of FIG. 1.

Referring to FIG. 9A, the interlocking slider 190 includes a sixth cam 195 formed as an elongated hole on a side that is close to the disk guide 155. The sixth cam 195 includes a straight path 196 extending in the x-axis direction, and a chucking path 197 crossing the straight path 196. The sixth cam 195 receives a sixth cam follow-up boss 217 of a second connection lever 215, which is rotatably supported by the first chassis 120 based on a pivot axis 216. The second connection lever 215 includes a second connection lever cam 220, which is formed as an elongated hole extending along the stepped path.

A dead end 221 on a side of the second connection lever cam 220 is closer to the pivot axis 216 of the second connection lever 215 than a dead end on the other side of the second connection lever cam 220. In addition, the pivot axis 216 is closer to the turn table 112 (refer to FIG. 2) than the second connection lever cam 220. The second connection lever cam 220 receives the boss 158 protruding downward from the front edge 157 of the disk guide 155. From the time where the ejecting of the disk D is finished to the time where the chucking of the disk D is completed, the sixth cam follow-up boss 217 is located in the straight path 196 of the sixth cam 195, and the boss 158 on the front edge 157 of the disk guide 155 is located at the dead end 221 on a side of the second connection lever cam 220. Therefore, the front edge 157 of the disk guide 155 is bent toward the turn table 112 based on a hinge 156 to guide the center portion of the disk D, which is inserted into the optical disk apparatus 100, to the rotary shaft C1 (refer to FIG. 4) of the turn table 112.

In addition, as shown in FIG. 9B, at the time where the chucking of the disk D is finished, the interlocking slider 190 moves in the positive direction of the x-axis, and accordingly, the sixth cam follow-up boss 217 moves in the chucking path 197 so that the second connection lever 215 rotates about the pivot axis 216 in the clockwise direction. Therefore, the boss 158 on the front edge 157 of the disk guide 155 is located at the dead end 222 on the other side of the second connection lever cam 220, and the front edge 157 of the disk guide 155 rotates about the hinge 156 in the counter-clockwise direction to be separated from the outer circumferential portion of the disk D. The ejecting of the disk D may be performed in a reverse order of the insertion of the disk D, which is described with reference to FIGS. 9A and 9B, and thus, further descriptions thereof will be omitted for conciseness.

Figure 10A:
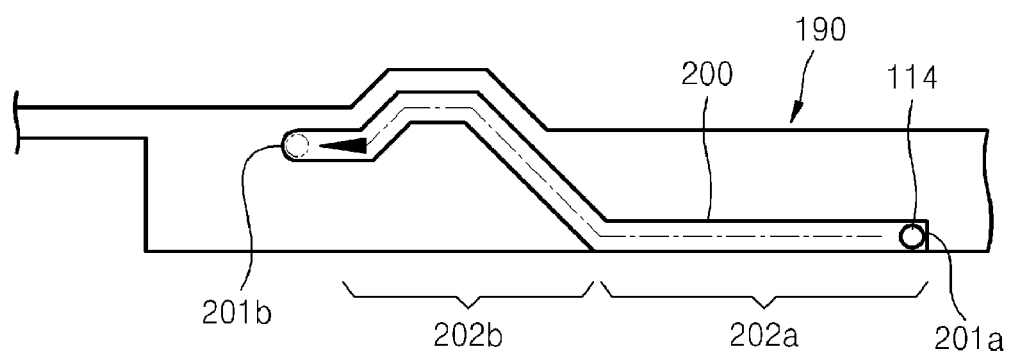
FIG. 10A is a diagram illustrating a side view showing a cam installed on a side surface of the interlocking slider shown in FIGS. 7A through 7C, to guide a first chucking protrusion.
Figure 10B:
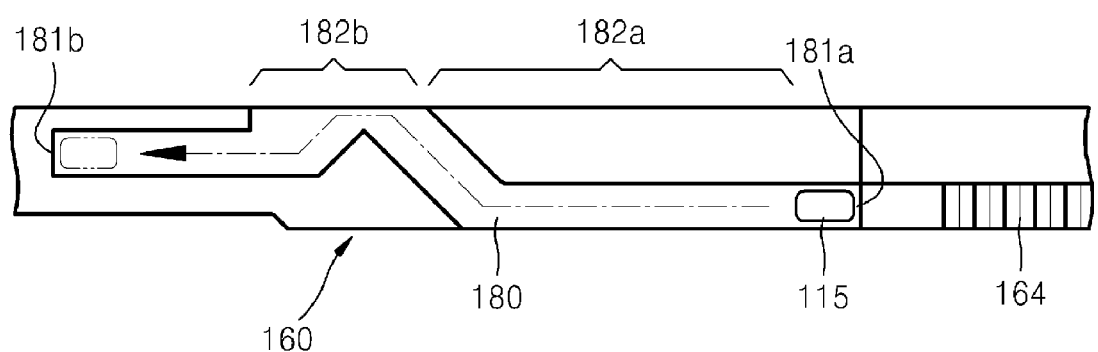
FIG. 10B is a diagram illustrating a side view showing a cam installed on a side surface of the main slider shown in FIGS. 5A through 5E, to guide a second chucking protrusion.

FIG. 10A shows a cam installed on a side surface of the interlocking slider shown in FIGS. 7A through 7C, to guide a first chucking protrusion, and FIG. 10B shows a cam installed on a side surface of the main slider shown in FIGS. 5A through 5E, to guide a second chucking protrusion.

Referring to FIG. 10A, a fifth cam 200 to lead the chucking and unchucking of the disk D by lifting or descending the main unit (110, refer to FIG. 2) is formed on a side surface of the interlocking slider 190, which faces the main unit 110. The fifth cam 200 is formed as a groove including a reset dead end 201a on a side thereof, a chucking dead end 201b on the other side thereof, and a straight path 202a and a bent path 202b between the dead ends 201a and 201b. A first chucking boss 114 protruding from a surface of the main unit 110, which faces the interlocking slider 190, is received in the fifth cam 200. The first chucking boss 114 is located at the reset dead end 201a in the disk ejected status and the reset status (refer to FIGS. 7A and 7B) of the optical disk apparatus 100, and is located at the chucking dead end 201b in the disk chucked status (refer to FIG. 7C) after passing through the straight path 202a and the bent path 202b as the disk D is inserted into the optical disk apparatus 100. A height of the chucking dead end 201b is higher than those of the reset dead end 201a and the straight path 202a, and thus, the main unit 110 is elevated, and the unchucking rod 118 (refer to FIG. 2) is hidden by the elevated main unit 110. The ejecting of the disk D may be performed in inverse reverse order of the insertion of the disk D, and thus, further descriptions thereof will be omitted for conciseness.

Referring to FIG. 10B, the fourth cam 180 to lead the chucking and unchucking of the disk D by lifting or descending the main unit 110 (refer to FIG. 2) is disposed on a side surface of the main slider 160, which faces the main unit 110. The fourth cam 180 is formed as a groove including a reset dead end 181a on a side thereof, a chucking dead end 181b on the other side thereof, and a straight path 182a and a bent path 182b between the dead ends 101a and 181b. A second chucking boss 115 protruding from a surface of the main unit 110, which faces the main slider 160, is received in the fourth cam 180. The second chucking boss 115 is located at the reset dead end 181a or in the straight path 182a in the disk ejected status and the reset status (refer to FIG. 5A) of the optical disk apparatus 100, and is located at the chucking dead end 181*b* in the disk chucked status (refer to FIG. 5E) after passing through the straight path 182*a* and the bent path 182*b* as the disk D is inserted into the optical disk apparatus 100. A height of the chucking dead end 181*b* is higher than those of the reset dead end 181*a* and the straight path 182*a*, and thus, the main unit 110 is elevated, and the unchucking rod 118 (refer to FIG. 2) is hidden by he elevated main unit 110. The ejecting of the disk D may be performed in inverse reverse order of the insertion of the disk D, and thus, further descriptions thereof will be omitted for conciseness.

Figure 11:
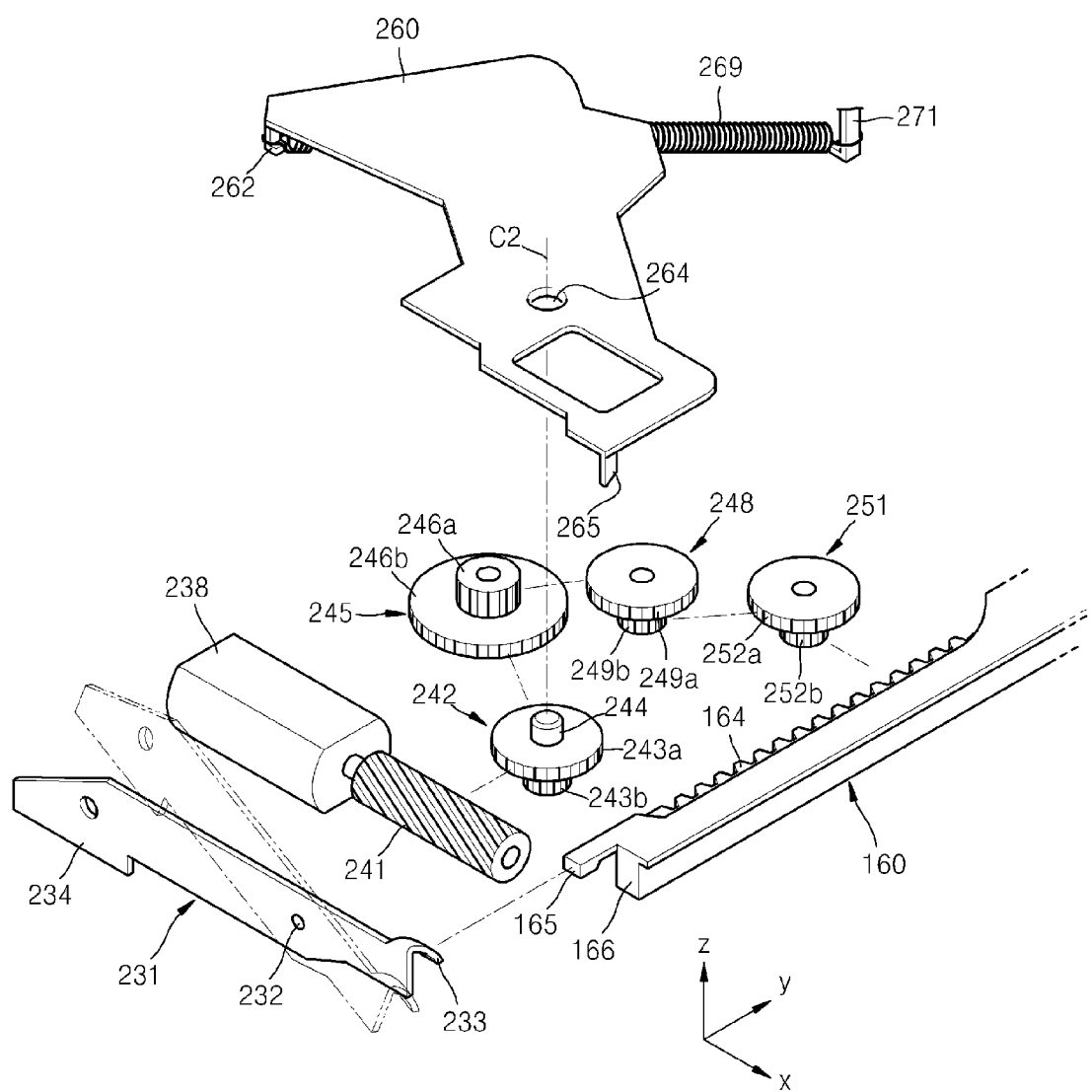
FIG. 11 is a diagram illustrating an exploded perspective view showing a driving motor, a plurality of gears, and a shutter in the optical disk apparatus of FIG. 1.

FIG. 11 shows the driving motor 238, a plurality of gears, and a shutter 231 in the optical disk apparatus of FIG. 1.

Referring to FIG. 11, a unit to transfer the driving force of the driving motor 238 to the main slider 160 includes a worm gear 241 formed on a driving axis of the driving motor 238, a rack gear 164 formed on the main slider 160, and first through fourth driven gears 242, 245, 248, and 251 formed between the worm gear 241 and the rack gear 164. The second driven gear 245 is supported by a gear bracket 260 disposed under the second chassis 125 (refer to FIG. 2). The first, third, and fourth driven gears 242, 248, and 251 are supported by the second chassis 125, and a penetration hole 264, through which a shaft 244 of the first driven gear 242 may penetrate, is formed in the gear bracket 260.

An upper gear train 243*a* of the first driven gear 242 is engaged with the worm gear 241, and a lower gear train 243*b* of the first driven gear 242 is engaged with a lower gear train 246*b* of the second driven gear 245. In addition, an upper gear train 246*a* of the second driven gear 245 is engaged with an upper gear train 249*a* of the third driven gear 248, a lower gear train 249*b* of the third driven gear 248 is engaged with an upper gear train 252*a* of the fourth driven gear 251, and a lower gear train 252*b* of the fourth driven gear 251 is engaged with the rack gear 164.

The gear bracket 260 is pivotably supported by the second chassis 125. A pivot axis C2 of the gear bracket 260 and a rotary shaft of the first driven gear 242 are the same as each other, and are in parallel with the rotary shaft C1 of the disk D (refer to FIG. 4). The gear bracket 260 pivots between a first position, where the first through fourth driven gears 242, 245, 248, and 251 are engaged sequentially, and a second position, where the engagement between the second driven gear 245 and the third driven gear 248 is released, and is elastically biased by a spring 269 to be maintained at the first position. The spring 269 has an end supported by a supporting portion 271 formed on the second chassis 125, and the other end supported by a supporting portion 262 formed on the gear bracket 260. The second driven gear 245 supported by the gear bracket 260 is biased to the third driven gear 248 by the elastic force of the spring 269.

The gear bracket 260 further includes an inclined surface 265 that is close to the front surface 105 (refer to FIG. 1) of the optical disk apparatus 100. The inclined surface 265 is formed on an opposite side of the spring 269 based on the pivot axis C2. Where the gear bracket 260 is located at the first position, the inclined surface 265 is located on an insertion path of the pin (not shown) that is inserted through the eject hole 109 (refer to FIG. 1) to block the pin.

However, where the insertion of the pin through the eject hole 109 is continued, the gear bracket 260 is slightly rotated about the pivot axis C2 in the counter-clockwise direction due to the compression force of the pin applied to the inclined surface 265, and thus, the engagement between the second driven gear 245 and the third driven gear 248 is terminated. Therefore, the main slider 160 may independently move in the y-axis direction regardless of the rotation of the rotary shaft of the driving motor 238. In addition, where the pin is pushed to the positive direction of the y-axis, the inclined surface 265 escapes from the insertion path of the pin, and the main slider 160 continues to proceed in the positive direction of the y-axis, and the disk D inserted in the optical disk apparatus 100 may be ejected by the manual operation.

The shutter 231 is supported by the front surface of the optical disk apparatus 100 to be rotatable based on the pivot axis 232. The shutter 231 includes a front edge portion 234 to close the slot 107 (refer to FIG. 1) on a side thereof, and an inclined surface 233 on the other side thereof. Where the main slider 160 moves to the front surface of the optical disk apparatus 100 so that the pusher 165 compresses the inclined surface 233 at the time where the chucking of the disk D is finished, the inclined surface 233 descends and the front edge portion 234 ascends to close the slot 107 as denoted by the chain double-dashed line in the drawing.

According to examples described above, an optical disk apparatus may be provided where an interlocking slider engaged with a main slider directly drives an eject lever and a boss for performing a disk chucking operation without other intervening components. Accordingly, the number of components for loading and unloading a disk may be reduced, and thus, the optical disk apparatus may be fabricated with a smaller thickness and in lighter weight.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical disk apparatus comprising:
a housing having a slot to receive a disk;
a main unit disposed in the housing and having a turn table to rotate the disk;
a main slider configured to reciprocate in a direction corresponding to insertion and ejection of the disk;
an interlocking slider configured to engage with the main slider to reciprocate in another direction in response to the reciprocating of the main slider; and
a disk ejecting unit directly connected to the interlocking slider and configured to eject the disk inserted in the housing through the slot.

2. The optical disk apparatus of claim 1, wherein:
the disk ejecting unit rotates about a pivot axis that is separated from the interlocking slider and includes a protrusion that is separated from the pivot axis and interferes with the interlocking slider, and
the interlocking slider includes a cam to receive the protrusion.

3. The optical disk apparatus of claim 2, wherein the disk ejecting unit is elastically biased to eject the disk.

4. The optical disk apparatus of claim 3, wherein the cam includes a protrusion holding surface which restrains the rotation of the protrusion where the disk rotates on the turn table.

5. The optical disk apparatus of claim 1, further comprising:
a driving motor to drive the main slider; and
a fourth switch to control the driving of the driving motor, wherein turning on/off of the fourth switch depends upon a rotation angle of the disk ejecting unit.

6. The optical disk apparatus of claim 1, further comprising:
a first connection lever to connect a movement of the main slider with a movement of the interlocking slider, and rotate in response to a movement of the main slider or the interlocking slider.

7. The optical disk apparatus of claim 1, wherein a side surface of the interlocking slider faces a side surface of the main unit, and a movement of the interlocking slider causes the main unit to rise or descend with respect to the housing.

8. The optical disk apparatus of claim 7, wherein the main unit includes a boss protruding toward the side surface of the interlocking slider, and the interlocking slider includes a cam in which the boss is received and slid to be lifted.

9. The optical disk apparatus of claim 1, wherein a side surface of the main slider faces a side surface of the main unit, and a movement of the main slider causes the main unit to rise or descend with respect to the housing.

10. The optical disk apparatus of claim 9, wherein the main unit includes a boss protruding toward the side surface of the main slider, and the main slider includes a cam in which the boss is received and slid to be lifted.

11. The optical disk apparatus of claim 1, further comprising a disk guide to guide the disk inserted in the housing, wherein:
the disk guide includes a front edge that induces a center portion of the disk inserted in the housing toward the turn table, and
the front edge of the disk guide is formed to rotate in communication with the interlocking slider.

12. The optical disk apparatus of claim 11, further comprising:
a second connection lever to connect a movement of the interlocking slider with a movement of the front edge of the disk guide, and rotate in response to a movement of the interlocking slider.

13. The optical disk apparatus of claim 1, further comprising:
a plurality of switches that are turned on/off according to a position of the main slider.

14. The optical disk apparatus of claim 13, wherein the plurality of switches comprise a first switch to change a rotating direction of the driving motor after ejecting the disk through the slot, a second switch to stop a rotation of the driving motor in a standby status for insertion of the disk, and a third switch to stop a rotation of the driving motor and start a rotation of the turn table where the disk is inserted into the housing.

15. The optical disk apparatus of claim 14, wherein the first through third switches are arranged in a row along a proceeding direction of the main slider, and the second and third switches are arranged at different heights from each other.

16. The optical disk apparatus of claim 1, further comprising:
a loading lever to compress the disk so that a center portion of the disk inserted in the housing reaches the turn table in conjunction with a movement of the main slider.

17. The optical disk apparatus of claim 1, further comprising:
a shock absorber to prevent the disk ejecting unit and the interlocking slider from being damaged where the disk is inserted.

18. The optical disk apparatus of claim 1, further comprising:
a manual disk ejecting unit to eject the disk from the housing in response to the main slider being operated manually.

19. The optical disk apparatus of claim 1, further comprising:
a shutter to open and close the slot in conjunction with a movement of the main slider.

20. The optical disk apparatus of claim 1, wherein:
the main slider is configured to reciprocate in a direction parallel with insertion and ejection directions of the disk, and
the interlocking slider is configured to engage with the main slider to reciprocate in a direction perpendicular to a reciprocating direction of the main slider.

21. The optical disk apparatus of claim 1, wherein the interlocking slider is connected to the disk ejecting unit to directly drive the disk ejecting unit.

22. The optical disk apparatus of claim 1, wherein the interlocking slider is connected to the disk ejecting unit to directly drive the disk ejecting unit and a boss for performing a disk chucking operation.

23. An optical disk apparatus to record and/or read with respect to a disk, the apparatus comprising:
a housing configured to define the optical disk apparatus and having a slot to receive the disk;
a main unit having a turn table to rotate the disk and an optical pickup to record and/or read with respect to the disk;
a main slider configured to move in first and second directions corresponding to insertion and ejection of the disk;
a disk ejecting unit configured to eject the disk inserted into the housing through the slot; and
an interlocking slider directly connected to the interlocking slider and configured to engage with the main slider to drive the disk ejecting unit.

* * * * *